ized along with titanium tetrachloride to in-
United States Patent

Angerman et al.

[11] 3,856,929
[45] Dec. 24, 1974

[54] PRODUCTION OF ANATASE TIO₂ BY THE CHLORIDE PROCESS

[75] Inventors: Albert Henry Angerman; Carl Gordon Moore, both of Wilmington, Del.

[73] Assignee: E. I. du Pont de Nemours and Company, Wilmington, Del.

[22] Filed: Aug. 25, 1972

[21] Appl. No.: 283,768

[52] U.S. Cl. .................. 423/613, 423/610, 106/300
[51] Int. Cl. ......................... C01g 23/04, C09c 1/36
[58] Field of Search .................. 423/613, 614, 610; 106/300

[56] References Cited
UNITED STATES PATENTS

| | | | |
|---|---|---|---|
| 2,462,978 | 3/1949 | Krchma et al. ..................... | 423/613 |
| 2,980,509 | 4/1961 | Frey ..................................... | 423/613 |
| 3,329,483 | 7/1967 | Evans et al. ......................... | 423/614 |
| 3,356,456 | 12/1967 | Wilson ................................ | 423/613 |
| 3,433,594 | 3/1969 | Wilson et al. ....................... | 423/613 |
| 3,434,799 | 3/1969 | Wilson ................................ | 423/613 |
| 3,486,913 | 12/1969 | Zirngibl et al. ................. | 423/613 X |
| 3,640,745 | 2/1972 | Darr et al. ..................... | 423/613 X |
| 3,650,694 | 3/1972 | Allen .................................. | 423/613 |

*Primary Examiner*—Edward Stern

[57] ABSTRACT

Anatase TiO₂ is produced by the "chloride" process involving the vapor phase oxidation of titanium tetrachloride. A silicon halide and a phosphorus halide are co-oxidized along with titanium tetrachloride to increase the percentage of anatase in the product.

5 Claims, No Drawings

PRODUCTION OF ANATASE TIO₂ BY THE CHLORIDE PROCESS

BACKGROUND OF THE INVENTION

Anatase $TiO_2$ accounts for a substantial proportion of the world's production of $TiO_2$ pigments. Certain spectral and other properties have been associated with anatase making it preferred over rutile in many end-use areas, e.g., in the paper industry.

Although there are many suggestions in the literature for producing anatase by the "chloride" process, involving the vapor phase oxidation of $TiCl_4$, it appears that most commercial grades of anatase have continued to be produced by the "sulfate" process, involving the formation and hydrolysis of titanyl sulfate solutions.

The limited use of the chloride process to date in the production of anatase is at least partly attributable to difficulties associated with the anatase promoters (or rutile inhibitors) which are considered necessary as co-oxidation additives for the $TiCl_4$. One such additive which has been suggested in Krchma et al., U.S. Pat. No. 2,462,978 is phosphorus trichloride but experience has shown that it tends to decrease the optical properties of the pigment, particularly undertone. Other disadvantages, notably excess pigment grit, also occur in the case of silicon tetrachloride which is widely mentioned for its anatase promoting effect, e.g., in Frey, U.S. Pat. No. 2,980,509.

A further problem encountered in past attempts to use anatase promoters is that the anatase/rutile ratio of the resultant pigment usually increases more slowly as increasing amounts of the promoter are used. In the case of either $PCl_3$ or $SiCl_4$, for example, some 2 percent of the oxidation product thereof (based on pigment weight) may be required to produce a pigment containing at least about 75 percent anatase, which is usually desired for a pigment to have the properties which typically characterize anatase pigments. In any event, such promoters constitute expensive chamicals in relation to the $TiCl_4$ such that the utilization of reduced amounts thereof would be highly advantageous. The utilization of reduced amounts of $SiCl_4$, or other silicon halides, would be further advantageous in that the water dispersibility of the resultant pigments tends to become increasingly difficult with increasing silica content.

SUMMARY OF THE INVENTION

In accordance with the invention, it has been found that anatase pigments are advantageously produced by the chloride process using in combination minor amounts of silicon and phosphorus halides as anatase promoters to be oxidized along with the $TiCl_4$. The use of a combination of silicon and phosphorus halides is more effective than either halide alone with the result that lower promoter addition levels are possible. Whereas, for example, about 2 percent oxidized $SiCl_4$ (calculated as $SiO_2$) or 2 percent oxidized $PCl_3$ (calculated as $P_2O_5$) is required to achieve a $TiO_2$ pigment containing an 80/20 ratio of anatase/rutile, the same ratio has been attained using a combination of 0.67 percent co-oxidized $SiCl_4$ and 0.156 percent $PCl_3$. The use of such low amounts serves to keep optical properties and dispersibility characteristics of the pigment at a suitable high level while providing substantial cost advantages and avoidance of excess grit in the pigment.

The improved performance of a combination of silicon halide and phosphorus halide is believed attributable to the different mechanisms by which each tends to be involved in the formation of anatase crystals. The silicon halide apparently serves to interstitually stabilize the anatase crystals while the phosphorus halide inhibits rutile formation by forming a $P_2O_5$-$TiO_2$ glass melt on the particle surfaces. In any event, each mechanism is of greatest efficiency at lower addition levels such that the utilization of the two in combination makes it possible to maximize the effectiveness of each without deleteriously affecting the pigment properties.

The silicon and phosphorus halides employed in the practice of the invention must be gaseous and oxidizable to silica and a phosphorus oxide, respectively, under the elevated temperature conditions employed to oxidize the $TiCl_4$. The halides are preferably chlorides or oxychlorides but others such as the bromides, bromochlorides or oxybromides may be utilized. Especially useful silicon halides are silicon tetrachloride, and silicon trichloride, whereas especially useful phosphorus halides are phosphorus trichloride, phosphorus oxychloride, phosphorus dichloride, and phosphorus pentachloride. While there is no objection to use of halides such as those containing atoms in addition to silicon, phosphorus and halogen, there is generally no further advantage in their use and they tend to be more costly chemicals.

As indicated hereinabove, an important advantage of the invention resides in the ability to utilize relatively small amounts of the silicon halide and the phosphorus halide to achieve a pigment of high anatase content without adversely affecting, at least to any substantial degree, the properties of the pigment. In general, it is most practical to use amounts (all on a weight basis) which will provide about 0.25 to 1.5 percent oxidized silicon halide, calculated as $SiO_2$, and about 0.05 to 1 percent oxidized phosphorus halide, calculated as $P_2O_5$, in the pigment. As a practical matter, there is seldom a need to utilize amounts outside the preferred range of 0.4 to 1 percent oxidized silicon halide and 0.1 to 0.5 percent oxidized phosphorus halide. however, the most efficient utilization of these materials has been encountered when using amounts to provide about 0.4 to 0.65 percent oxidized silicon halide, as $SiO_2$, and 0.15 to 0.35 percent oxidized phosphorus halide, as $P_2O_5$, in the pigment.

The utilization of relatively low amounts of oxidized phosphorus halides, i.e., in the above-mentioned preferred proportions, is highly advantageous since any detrimental effect upon pigment properties, notably undertone, can thus be kept at a suitable level. Indeed from the standpoint of effect upon anatase production, there appears to be an abrupt leveling out when the percentage of oxidized phosphorus halide reaches about 0.3 percent.

One advantage of using the phosphorus halide in accordance with the present invention is that the resultant phosphorus oxide in the finished pigment markedly contributes to the ease with which that pigment can be dispersed in water, i.e., for use in conventional paper or paint systems. In this respect, it is frequently advantageous to utilize more phosphorus halide than would otherwise be required merely to yield a high anatase pigment. On the other hand, it is generally undesirable to use the phosphorus halide in amounts that will deleteriously affect the undertone of the pigment. In general, it is preferred that the amount of silicon halide be kept as low as possible in order that the dispersibility characteristics of the pigment in water will remain at a high level.

A preferred technique for introducing the silicon and phosphorus halides into the reaction zone involves adding predetermined quantities of each directly into the stream of $TiCl_4$ before or after it is heated and vaporized.

Alternatively, they may be introduced as a separate stream, either alone, together, or in conjunction with a diluent gas such as chlorine.

In one embodiment of the invention, there may be used a metal ion nucleant to facilitate the maintenance of a small particle size pigment of suitable optical properties, i.e., particularly as regards undertone. The utilization of such metal ion nucleants, e.g., in the form of salts such as chlorides, is described in Lewis et al., U.S. Pat. No. 3,208,866. Among the metal ion nucleants which may be mentioned are sodium, potassium, lithium, rubidium, cesium, calcium, barium, strontium, and cerium. Potassium is the preferred nucleant, however, In any event, the nucleant is advantageously employed in an amount which will provide about 1 to 5,000 parts per million thereof based on the resulting pigment.

In carrying out the process of the invention, it is preferred to use a reaction vessel of such design, construction and dimensions that a continuous flow of reactants and reaction products can be readily maintained therein and such control can be exercised over the velocities, mixing rates, temperatures and reaction retention times utilized that, on the average, the reactants and products remain in the reaction zone for but a limited, relatively short period of time. Particularly useful types of reactor apparatus comprise those disclosed in Willcox, U.S. Pat. No. 2,791,490. Such apparatus can comprise an elongated mixing and reaction vessel, relatively restricted in cross section and constructed of an externally cooled corrosion resistant metal or alloy and optionally lined with a refractory material such as fused silica, magnesia, porcelain, etc. Quick mixing and reaction is effected therein by separately and continuously charging the reactants at controlled rates into the reaction zone wherein quick mixing and reaction is brought about by charging one reactant as a thin, sheeted stream directly into the other reactant and in a direction angular to the axis of flow of such other reactant. For example, preheated, vaporized anhydrous titanium tetrachloride containing vaporous $SiCl_4$ and $PCl_3$ can be continuously and separately charged to the reaction zone of the apparatus which zone is maintained within a 900–1400°C. temperature. Concurrently preheated dry oxidizing gas such as oxygen, air, or oxygen enriched air is charged via a separate inlet to the reaction zone. A convenient means for drying the oxygen involves inclusion of a small amount of chlorine gas, as any water present will then react to form HCl.

A cooling gas such as chlorine, for example, may be introduced through perforations in the reactor wall as described in U.S. Pat. No. 3,203,763 to aid in lowering the temperature of the resulting gaseous, $TiO_2$-containing suspension to below 600°C. to prevent an undesired increase in the $TiO_2$ pigment particle size and to maintain the anatase crystal structure. Rapid cooling can be conventionally effected, useful methods therefor including those described in U.S. pat. 2,721,626. These methods involve for example the use of large size attritive particles, such as rutile or anatase, which are introduced into the cooler conduit. The pigmentary $TiO_2$ product, at from about 75–250°C. temperature, which is recovered from the quenching operation, is then separated from the by-product gases in the usual manner. Normally, the oxidation reaction is carried out at substantially atmospheric pressures or slightly thereabove, e.g., 1,150 to 1,500 mm Hg (abs.), but, if desired, other super- or subatmospheric pressures can be resorted to. The time period of retention of reactants and reaction products within the reaction zone is also important to the production of the pigment quality. In general, the retention time of all reactants within the mixing and reaction zone must not exceed about 5 seconds nor be less than about 0.01 second with a preferred time, to obtain an optimum quality $TiO_2$ pigment, being in the range of from 0.5 to 1 second.

The titanium tetrachloride used preferably comprises a high-purity, anhydrous material free of undesirable contaminants such as vanadium, iron, copper, etc., to assure production of a pigment exhibiting exceptionally high whiteness and brightness characteristics. As water tends to promote the formation of the rutile crystal, it is generally desirable that all reactants be anhydrous.

While the process has been described with reference to the mixing and reacting of streams of oxygen and vaporized titanium tetrachloride in a conduit-type reactor with utilization of a circumferential slot jet for introducing one reactant into the other, this is merely preferred to obtain substantially instantaneous mixing and reaction. Use is contemplated of other forms and means of continuous mixing to effect the desired reaction.

Although, as mentioned above, the temperature of the oxidation reaction (meaning the peak or maximum temperature in the reactor) is generally in the range of 900–1400°C., temperatures in the lower part of the range, i.e., 900–1,200°C., tend to favor the production of the anatase crystal and hence are preferred. The exothermic reaction can be maintained in the preferred range by appropriate control of the reaction conditions, i.e., the use of diluent gases such as nitrogen, external cooling means and even the use of subatmospheric pressure.

The $TiO_2$ products resulting from the vapor phase oxidation process of the invention can be collected by either wet or dry techniques, as desired, and employed as pigments with or without calcination and/or further treatment. If a finishing procedure is employed, the pigment can be conveniently collected in slurry form, treated with $K^+$ ion (e.g., using KOH), calcined to produce a polyphosphate surface, and then fluid energy milled with an alkanolamine to yield a product of further enchanced water dispersibility characteristics. A preferred procedure of this type is described in U.S. application Ser. No. 158,513, filed June 30, 1971, in the name of T. J. Beliveau. According thereto the titanium dioxide is subjected to calcination at a temperature of 500°C. to 1050°C. for a period of at least one-half hour while the titanium dioxide contains 0.05 to 1 percent by weight of alkali metal, based on the titanium dioxide, and 0.05 to 3 percent by weight of phosphorus (calculated as $P_2O_5$), based on titanium dioxide. Subsequently, the calcined titanium dioxide is subjected to dry milling in the presence of at least 0.05 percent by weight of an amine dispersing agent, e.g., mono-, di- or triethanol amine or 2-amino, 2 methyl-1-propanol. The phosphorus can, either in whole or in part, be derived from the oxidation of the phosphorus halide anatase promoter. In any case, the dry milling is preferably effected by micronizing in a fluid energy mill with steam, using a 0.5:1 to 4:1 ratio of steam to pigment, by weight. As an alternative finishing procedure, hydrous alumina may be precipitated into a slurry of the anatase pigment of the invention followed by the usual steps of washing, drying and fluid energy milling. In general, such finishing procedures as have previously been employed with sulfate anatase pigments can be practiced using the anatase pigments of the present invention.

The following examples illustrate the practice of the invention. Parts and percentages therein and elsewhere in the specification are by weight unless otherwise indicated. It will be understood that reference to a percentage of silicon halide or phosphorus halide connotes an amount thereof employed to give, on a weight basis, that stated percentage of oxidized halide (calculated as $SiO_2$ or $P_2O_5$, as the case may be) in the $TiO_2$ product.

The carbon black undertone (CBU) values set forth in the examples are determined by the methods described in U.S. Pat. No. 2,488,440 using a rating or value of 10 rather than 100 as used in said patent. A CBU value of 11 represents an acceptable quality pigment, with a preferred product exhibiting a CBU value in the range of about 12–16.

In the examples the crystal character (i.e., anatase-rutile content) of the pigment is determined by X-ray diffraction using a General Electric XRD-5 X-Ray Spectrometer. Using X-rays from a copper target, the optimum area for the rutile peak is between 26.9° and 27.7° with the peak height at 27.35° Bragg angle and the optimum area for the anatase peak is between 24.7° and 25.7° with the peak height at 25.25° Bragg angle.

EXAMPLE 1

There is employed a vapor phase tubular reactor of the type described in Kruse, U.S. Pat. No. 3,203,763. A stream of oxygen, heated by the combustion of toluene, containing chlorine gas (to remove water) and potassium chloride as a nucleant (added in the form of an aqueous solution to provide 20 parts per million of KCl, based on $TiCl_4$) is directed through an inlet axially into the passage of the tubular reactor.

A stream of heated $TiCl_4$ enters through another inlet by means of an annular discharge or circumferential slot jet inlet. The $TiCl_4$ stream thus merges into the oxygen stream at essentially a right angle juncture as illustrated in the figures of said U.S. Pat. No. 3,203,763. Immediately downstream of the juncture, dry chlorine gas, as a coolant, passes into the product stream through a series of holes provided in the side walls of the reactor. Attritive rutile $TiO_2$ particles, in an amount of about 5 percent based on the $TiO_2$ produced are then injected into the product stream in the manner described in U.S. Pat. No. 2,721,626 to facilitate cooling of the particles without excessive buildup of accumulations on equipment parts, particularly on the walls of the elongated cooling conduit prior to separation and collection.

The following conditions are generally maintained, it being understood that some minor fluctuations occur in a run over a duration of several hours:

The oxygen stream is preheated to about 1,460°C. and is fed in excess of that required to stoichiometrically react with the charge of halide reactants. This is a feed rate of about 36.4 kg./min. $O_2$ (after preheating) and about 23 kg./min. $Cl_2$. The $TiCl_4$ is preheated to 390°C. and is fed at a rate of approximately 205 kg./min. The $SiCl_4$ in liquid form is injected in the quantities specified in Table 1 below into the vaporized $TiCl_4$ upstream of the reactor, whereas liquid $PCl_3$ is injected into the $TiCl_4/SiCl_4$ mixture at the reactor. Both are immediately vaporized by the hot $TiCl_4$. The peak temperature in the reactor is estimated to be about 1,200°C., and the pressure in the reactor is about 1,205 mm. Hg. The dry chlorine gas coolant, at essentially room temperature, and containing some recycle chlorine is introduced at a rate of 73 kg./min.

The pigment so obtained is analyzed as follows:

TABLE 1

| Run | % $SiO_2$ | % $P_2O_5$ | % Anatase in Product | CBU |
|---|---|---|---|---|
| Control | 0.00 | 0.00 | 31 | 10½ |
| Control | 0.88 | 0.00 | 73 | 14 |
| A | 0.79 | 0.26 | 80 | 13 |
| B | 0.67 | 0.16 | 81 | 13 |
| C | 0.66 | 0.28 | 80 | 12½ |

EXAMPLE 2

The procedure of Example 1 is repeated except that the oxygen stream is preheated to 1,480°C., the dry chlorine gas coolant is used in the amount of 77 kg./min., and the reactor pressure is 1,215 mm. Hg. The results are shown in Table 2.

TABLE 2

| Run (Three analyses each plus an average) | | % $SiO_2$ | % $P_2O_5$ | % Anatase | CBU |
|---|---|---|---|---|---|
| 1 | | .70 | .30 | 83 | |
|   | | .62 | .30 | 83 | |
|   | | .61 | .29 | 85 | |
|   | Avg. | .64 | .30 | 84 | 11½ |
| 2 | | .59 | .29 | 83 | |
|   | | .50 | .29 | 84 | |
|   | | .53 | .28 | 84 | |
|   | Avg. | .54 | .29 | 84 | 11½ |
| 3 | | .60 | .29 | 85 | |
|   | | .46 | .27 | 86 | |
|   | | .53 | .28 | 85 | |
|   | Avg. | .53 | .28 | 85 | 11½ |
| 4 | | .65 | .26 | 89 | |
|   | | .59 | .25 | 88 | |
|   | | .58 | .25 | 88 | |
|   | Avg. | .61 | .25 | 88 | 12 |
| 5 | | .16* | .26 | 78 | |
|   | | .21 | .26 | 83 | |
|   | | .21 | .26 | 77 | |
|   | Avg. | .19 | .26 | 79 | 11½ |
| 6 | | .61 | .018 | 68 | |
|   | | .59 | .010 | 67 | |
|   | | .53 | .009 | 67 | |
|   | Avg. | .58 | .012 | 67 | 12 |
| 7 | | .64 | .19 | 78 | |
|   | | .57 | .19 | 79 | |
|   | | .59 | .20 | 78 | |
|   | Avg. | .60 | .19 | 78 | 12 |

*In this case the feed of $SiCl_4$ is discontinued but traces remain, presumably from a build-up in the reactor.

What is claimed is:

1. In the chloride process for producing $TiO_2$ pigment by the oxidation of titanium tetrachloride with an oxygen-containing gas in the vapor phase at an elevated temperature, the improvement for producing at least about 80 weight percentage of anatase of good dispersibility and undertone by effecting the oxidation in the presence of a silicon halide and a phosphorus halide, said halides being gaseous and oxidizable at said temperature, and said halides being present in amounts to provide weight percentage of 0.4 to 1 percent oxidized silicon halide, calculated as $SiO_2$, and 0.1 to 0.5 percent oxidized phosphorus halide, calculated as $P_2O_5$, in said pigment.

2. Process according to claim 1 wherein said halides are silicon tetrachloride and phosphorus trichloride, respectively.

3. Process according to claim 1 wherein there is present in the reaction zone a metal ion nucleant selected from the group consisting of sodium, potassium, lithium, rubidium, cesium, calcium, barium, strontium, and cerium.

4. Process according to claim 3 wherein said nucleant is present in the amount of about 1 to 5,000 parts per million, based on said pigment.

5. In the chloride process for producing $TiO_2$ pigment by the oxidation of titanium tetrachloride with an oxygen-containing gas in the vapor phase at an elevated temperature, the improvement for producing anatase of good dispersibility and undertone by effecting the oxidation in the presence of a silicon halide and a phosphorus halide, said halides being gaseous and oxidizable at said temperature, and said halides being present in amounts to provide weight percentage of 0.4 to 0.65 percent oxidized silicon halide, calculated as $SiO_2$, and 0.15 to 0.35 percent oxidized phosphorus halide, calculated as $P_2O_5$, in said pigment.

* * * * *